2 Sheets--Sheet 1.

N. D. WOOD & L. TAYLOR.

Horse Hay Rakes.

No. 166,176. Patented July 27, 1875.

WITNESSES
E. H. Bates
Geo. E. Upchurch

INVENTORS
Newton D. Wood
Lee Taylor
Chipman &c.
ATTORNEYS

N. PETERS, PHOTO-LITHOGRAPHER, WASHINGTON, D. C.

N. D. WOOD & L. TAYLOR.
Horse Hay Rakes.
No. 166,176. Patented July 27, 1875.
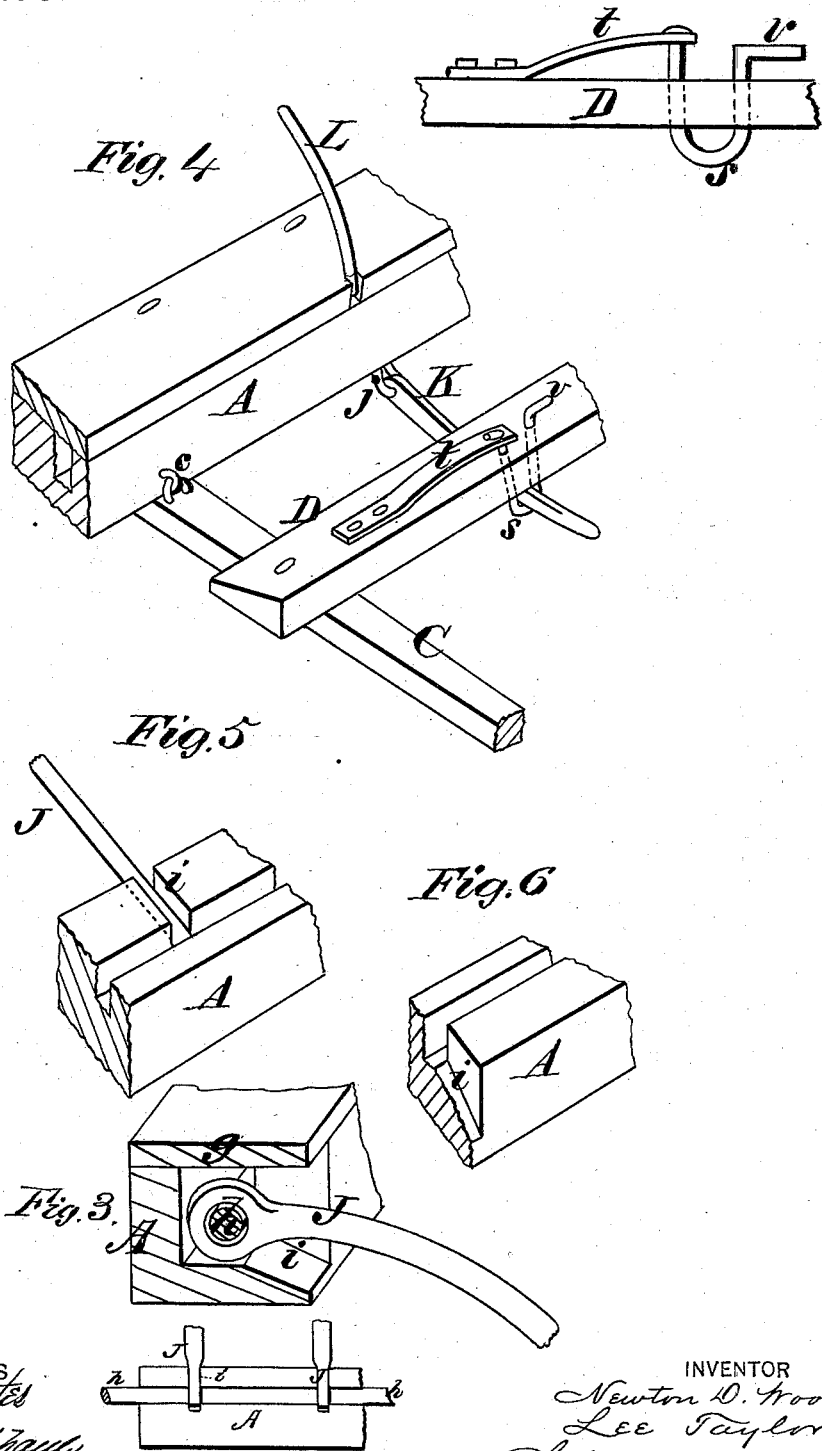

UNITED STATES PATENT OFFICE.

NEWTON D. WOOD AND LEE TAYLOR, OF BALLSTON SPA, NEW YORK.

IMPROVEMENT IN HORSE HAY-RAKES.

Specification forming part of Letters Patent No. 166,176, dated July 27, 1875; application filed April 17, 1875.

*To all whom it may concern:*

Be it known that we, NEWTON D. WOOD and LEE TAYLOR, of Ballston Spa, in the county of Saratoga and State of New York, have invented a new and valuable Improvement in Horse-Rake; and we do hereby declare that the following is a full, clear, and exact description of the construction and operation of the same, reference being had to the annexed drawings, making a part of this specification, and to the letters and figures of reference marked thereon.

Figure 1:
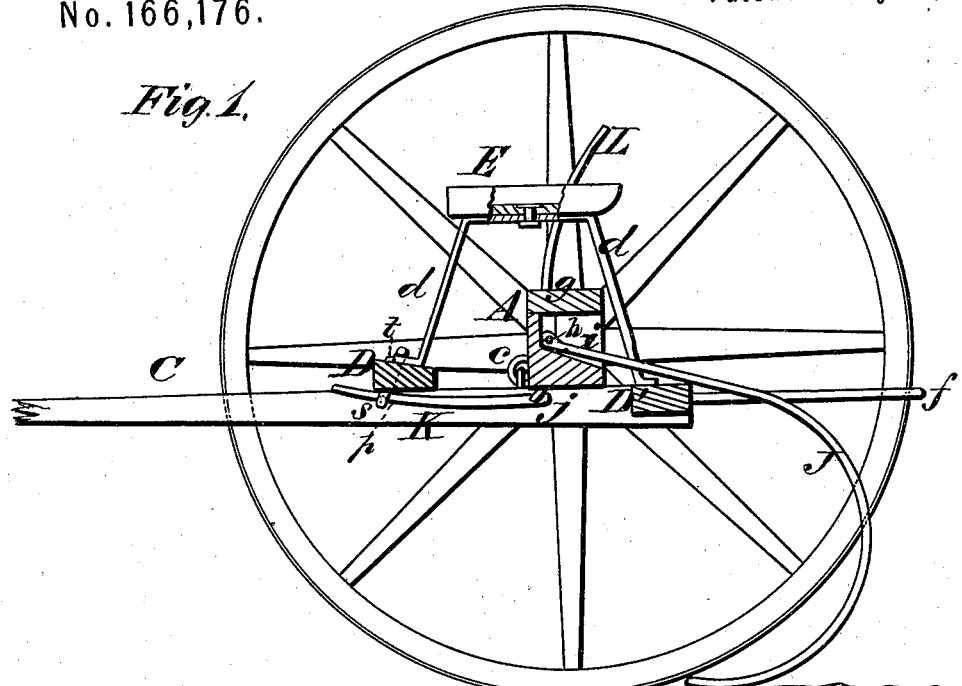
Figure 2:
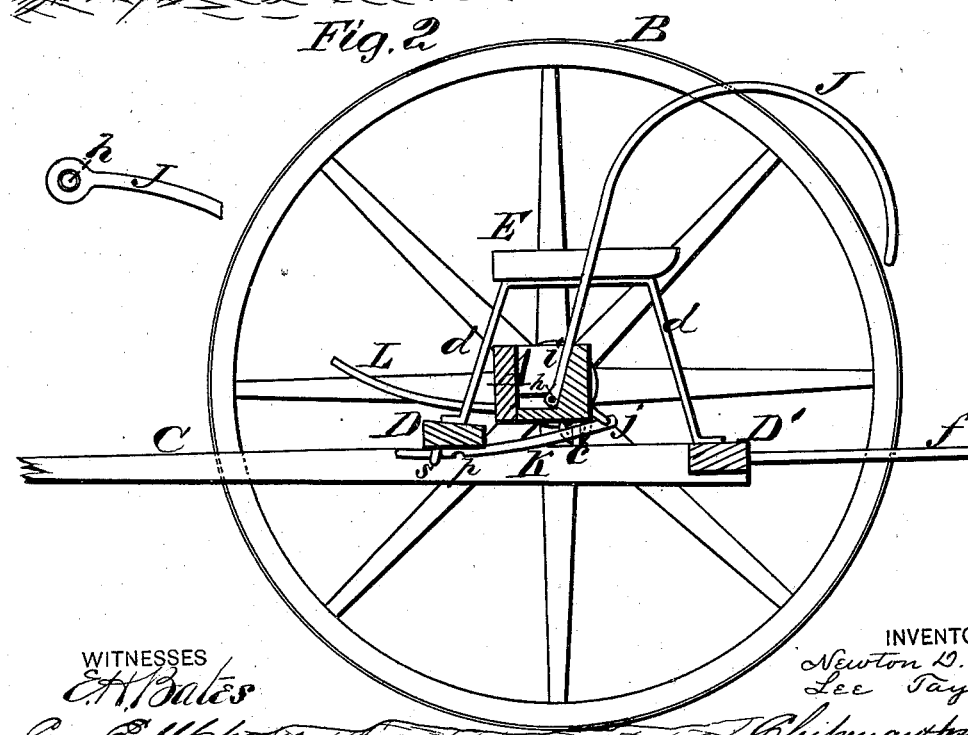

Figures 1 and 2 of the drawings are representations of longitudinal vertical sections of our device; and Figs. 3, 4, 5, and 6 are detail views of the same.

This invention has relation to horse hay-rakes, wherein the driver's seat is mounted on the thill-bar, and the thills are hinged to the axle in such manner that the weight of the driver is utilized in the act of raising the rake-teeth to discharge the gathered load.

The nature of my invention consists in a locking-bar, which is connected to the axle by means of a link, and which is provided with a spring-catch on the thill-bar, in combination with a hand-lever, which is secured to the axle in a rigid manner, and with thills, which are hinged to the axle, as will be hereinafter explained.

The invention also consists in a novel mode of attaching the rake-teeth to the axle of two transporting-wheels, and sustaining the teeth against lateral strain at and near their articulating ends, as will be hereinafter explained.

In the annexed drawings, A designates the axle of two transporting-wheels, B B; and C, the thills, which latter are connected by links c to the lower front corner of the axle A. The thills are connected together, in front of the axle, by means of a cross-bar, D, and in rear of the axle the thills are again connected together by means of a cross-bar, D'. E designates the driver's seat, which is mounted upon standards d d, rising from the two bars D D', and which is pivoted to the connecting portion of these standards, so that it can be moved horizontally for allowing the driver to turn to the right or left. The axle A has a groove in its upper side, extending from one end of it to the other, which groove is covered by a strip, g. J J designate the rake-teeth, which are curved in the usual well-known manner, and constructed with eyes on their upper ends, through which eyes a rod, h, passes freely, forming the pivotal connection of all the rake-teeth. The teeth J pass back through slots i, and extend over the rear bar D', from which bar extend clearing-teeth f, which aid in discharging the gathered loads. The teeth J are sustained against lateral strain by the sides of the slots i, and the teeth are sustained at the proper height by means of the bar D'. K designates a curved rod, which is connected by a link, j, to the bottom of the axle A, and which is constructed with a notch, p. The rod K is passed through a staple, s, which passes through the thill-bar D. One limb of this sliding staple s is attached to a retracting-spring, t, and the other limb is bent over, as shown in Fig. 4, to form a foot-piece, r. When the axle A is in the position shown in Fig. 1, the staple s will engage with the notch p in rod K, and hold the rake-teeth down to their work; and when it is desired to discharge a gathered load, the driver, with his foot, presses down the staple and releases the rod K, which will allow the parts to assume the position shown by Fig. 2. The driver uses a hand-lever, L, to assist him in tilting the axle forward and backward.

What we claim, and desire to secure by Letters Patent, is—

1. The rod K, pivoted to the axle A, carrying teeth J, and notched at p, in combination with the sliding staple s, applied to thill-bar D, and acted on by a retracting-spring, t, substantially as described.

2. The combination of the rake-teeth J, provided with eyes, with the rod h, grooved and slotted axle A, and cap g, substantially as described, and for the purpose set forth.

In testimony that we claim the above we have hereunto subscribed our names in the presence of two witnesses.

NEWTON D. WOOD.
LEE TAYLOR.

Witnesses:
HIRO JONES,
S. C. MEDBERY.